(12) United States Patent
McWhorter

(10) Patent No.: US 7,731,913 B2
(45) Date of Patent: *Jun. 8, 2010

(54) CARBON DIOXIDE FLUE GAS SEQUESTERING MECHANISM

(76) Inventor: Edward Milton McWhorter, 6931 Greenbrook Cir., Citrus Heights, CA (US) 95621

( * ) Notice: Subject to any disclaimer, the term of this patent is extended or adjusted under 35 U.S.C. 154(b) by 861 days.

This patent is subject to a terminal disclaimer.

(21) Appl. No.: 11/217,187

(22) Filed: Sep. 1, 2005

(65) Prior Publication Data
US 2006/0204424 A1 Sep. 14, 2006

Related U.S. Application Data

(63) Continuation-in-part of application No. 11/075,218, filed on Mar. 9, 2005, now Pat. No. 7,381,378.

(51) Int. Cl.
*B01D 50/00* (2006.01)

(52) U.S. Cl. ..................................... 422/168

(58) Field of Classification Search ................. 422/168; 96/301, 311, 313
See application file for complete search history.

(56) References Cited

U.S. PATENT DOCUMENTS

| | | | | |
|---|---|---|---|---|
| 576,087 A | * | 2/1897 | Braun | ......................... 422/237 |
| 3,710,554 A | * | 1/1973 | Brookman | .................... 96/305 |
| 4,308,241 A | * | 12/1981 | deVries | ....................... 423/210 |

* cited by examiner

*Primary Examiner*—Tom Duong

(57) ABSTRACT

The present invention incorporates new and useful improvements in the carbon dioxide sequestering mechanism. The ejector systems are rearranged in a manner that lowers the frictional effects of the resultant flow pattern after the flue gas and ejector spray have impacted in the receiver mechanism. The sequestered carbon dioxide resulting from the collision is retained in the scrubber water matrix for a prolonged period by adding a wedging mechanism designated as a compression band which extends the duration of the sequestering operation for a sufficient period of time for the absorbed gases to exit the receiver with the scrubber water flow into a separator vessel.

1 Claim, 3 Drawing Sheets

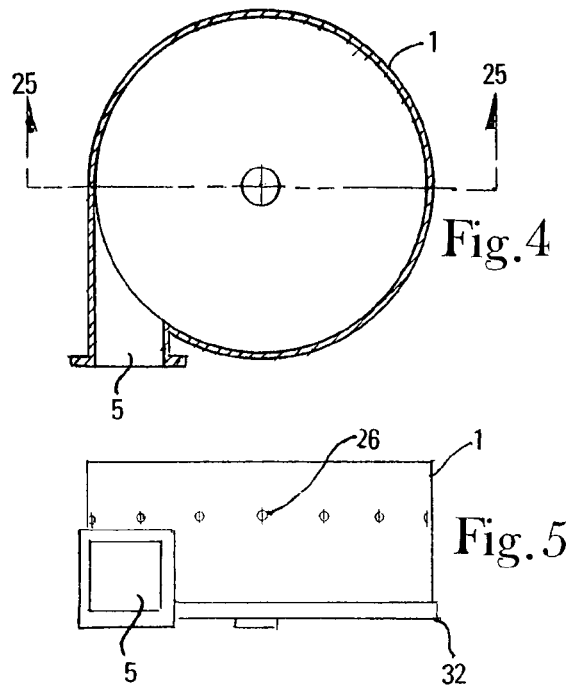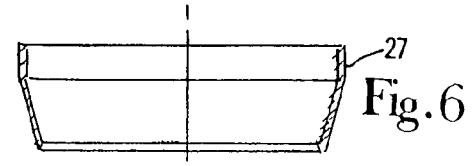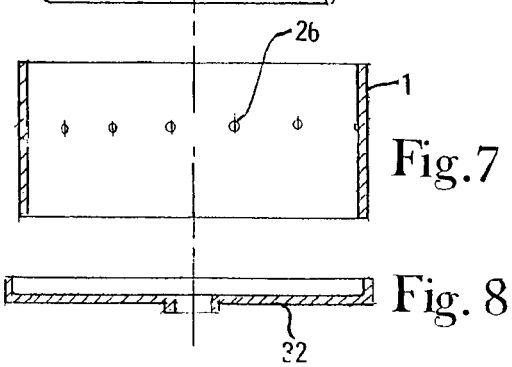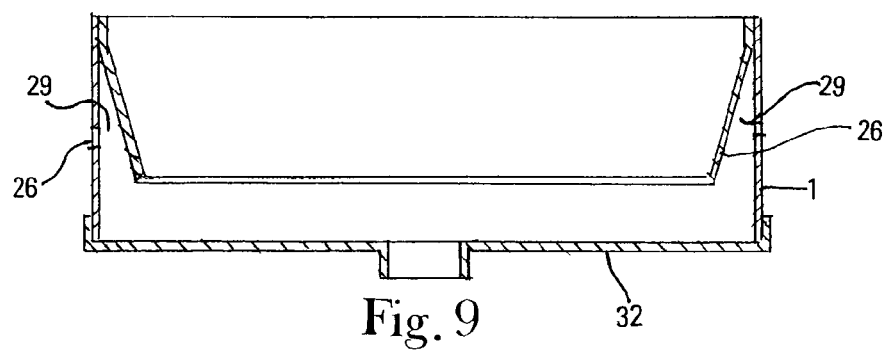

CARBON DIOXIDE FLUE GAS SEQUESTERING MECHANISM

CROSS REFERENCES

This application is a continuation-in-part of U.S. patent application Ser. No. 11/075,218, filed Mar. 9, 2005, now U.S. Pat. No. 7,381,378, which is hereby incorporated by reference in its entirety.

BACKGROUND OF THE INVENTION

The invention is a facility for removing carbon dioxide ($CO_2$) from the flue gases of coal fired furnaces by absorption in a water spray or dilute aqueous alkaline spray as described in Ref. 1 of the Cross References. In a subsequent treatment the carbon dioxide absorbed in the scrubber carbonated water system, and entrained in the circulatory system below the receiver, was allowed to diffuse into an ambient atmosphere and disposed of. The present invention follows much of the same procedure but changes the scrubbing operation within the receiver of the system described in Ref. 1 of the Cross References.

It is generally recognized that water under atmospheric equilibrium will absorb an equal volume of carbon dioxide ($CO_2$). Carbon dioxide is a compressible fluid and its volume is easily reduced as a function of the cube of its diameter ($Vol=0.536$ $dia^3$) such that a much larger quantity can be sequestered in the matrix of the water spray droplets which in this instance is considered incompressible.

Assuming a simplified collision theory in the Ref. 1 design described in the Cross References the flue gas draft flow was impacted with a convergent water spray from ejector nozzles mounted in the receiver which was designed as a cyclone separator. The impact of the ejector spray with the flue gas effluent in the receiver increased the $CO_2$ absorption capability by increasing localized pressure in the area of impact.

Since the new and useful improvements described in this application effect only the method of absorption occurring in the receiver of the scrubber system only this component is described in the detailed description which follows.

Because the system dynamic effects only the local compression at the time of impact the pressure depends exponentially on the velocity at the time of impact and is more effective and is made more efficient by altering the design and placement of those components within the receiver mechanism necessary to improve absorption and to maintain the holding pressure within the scrubber water matrix.

Two changes are present in the redesign of the receiver system mechanism.
1. The water spray ejectors are aligned parallel with the flue gas effluent and both streams will impart their momentum in the same direction and will minimize boundary layer friction.
2. A top rim band, designated as a compression band 27 is added to the receiver cylinder top edge to increase the $CO_2$ retention duration and promote a squeezing action at wedge point 29 retaining the pressure upon the spray droplets.

SUMMARY OF THE INVENTION

The invention is a flue gas scrubber operating at the outlet duct to the stack of a coal gas furnace. The system described is also useful in removing $CO_2$ from the effluent combustion gases of other types of fuel.

It is an object of the present invention to increase the absorption pressure of $CO_2$ within the receiver by increasing the gaseous velocity of the swirling flue gas medium within the receiver and by decreasing the boundary layer frictional component between parallel flowing gaseous streams by the introduction of water droplets above the flowing mixture.

It is yet another object of the invention to increase the short span duration of retention time of $CO_2$ in the water droplets by the addition of a compression band to the top of the receiver which will promote a wedging squeezing action at wedge point 29 on the absorbed $CO_2$ allowing it sufficient time to remain absorbed during its exit with the water stream.

BRIEF DESCRIPTION OF THE DRAWINGS

Drawings of the invention are presented as part of the specification.

FIG. 1 is presented only to orient the reader with the changes that are made on the original application.

FIG. 4 Is a top view of the receiver cylinder showing the ecentric inlet on one side of the cylinder which employs the cyclone separator principle and provides an interior circular flow path for the entering flue gas and subsequent impact with the injected water spray.

FIG. 5 Is a side view of the receiver shown in FIG. 4.

FIG. 6 is a side view of a metal rim of compression band 27 shown in section which is fixedly attached to the upper edge of the receiver 1 forming the interior surfaces of the compression zone to form the wedge point 29.

FIG. 7 Is a side view of the receiver cylinder shown in section.

FIG. 8 Is the bottom cover of the receiver.

FIG. 9 Is a side view of the receiver shown in cross-section showing the assembly of FIGS. 6, 7, and 8.

DETAILED DESCRIPTION OF THE INVENTION

Figure 1:
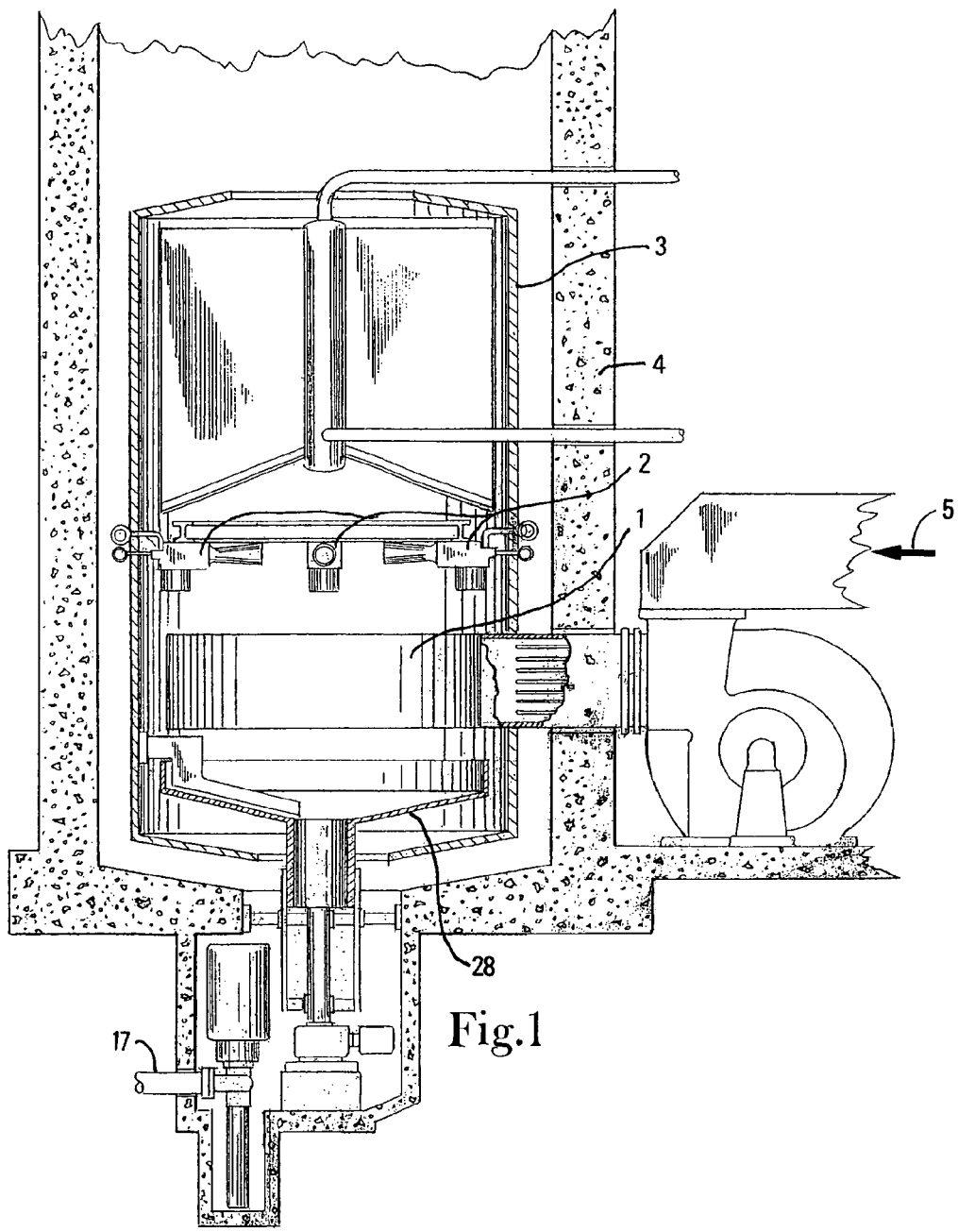
FIG. 1 is the coal flue gas scrubber assembly as originally designed and is shown principally in cross-section. The only components that are modified in the design of this invention are the ejector systems and the receiver. The ejectors flow is aligned with the flow of the flue gas inlet and are now placed within the receiver. The receiver cylinder height has been increased to accommodate the ejector placement within the receiver. A rim band has been added to the top of the receiver to increase the absorbed $CO_2$ retention time. Since only the ejector placement and the addition of the compression band 27 had been added

The invention shown in FIG. 1 is a liquid sorbent scrubber facility for the removal of carbon dioxide from combustion emissions of coal fired furnaces as first presented in Ref. 1 of the Cross References.

Receiver 1 and ejectors 2 are shown concentrically positioned in drum 3 which in turn is concentrically positioned within the concrete structure of stack 4.

The new and useful improvements presented in this disclosure are the realignment of flow direction and placement of ejectors 2 in receiver 1 and the placement of a rim band designated as a compression band 27 shown in FIGS. 6 and 9 fixedly attached to the upper edge of receiver 1. These two changes were incorporated in the design in order to increase the retention time of the absorbed CO$_2$ and thereby improve the absorption efficiency.

Figure 2:
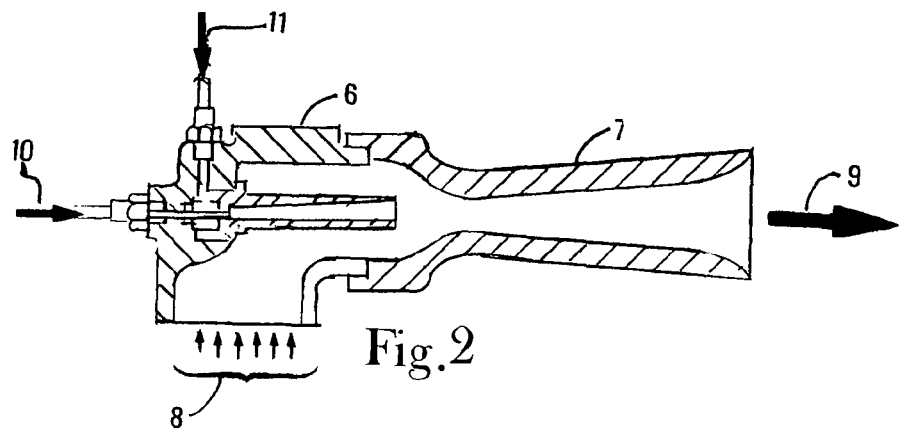
FIG. 2 Is a side view of the water and air ejector circuitry shown principally in cross-section.

Turning now to FIG. 2. FIG. 2 is a side view of the water and air ejector shown principally in cross-section in order to show the internal flow circuitry.

Water droplet size spraying from nozzle 7 through nozzle water spray exit 9 is controlled by adjusting the differential pressures between air inlet 10 and ejector water inlet 11. Entrained carbon dioxide from the reflux manifold 12 shown in FIG. 3 is aspirated into the ejector spray circuit from inlet port 8.

Figure 3:
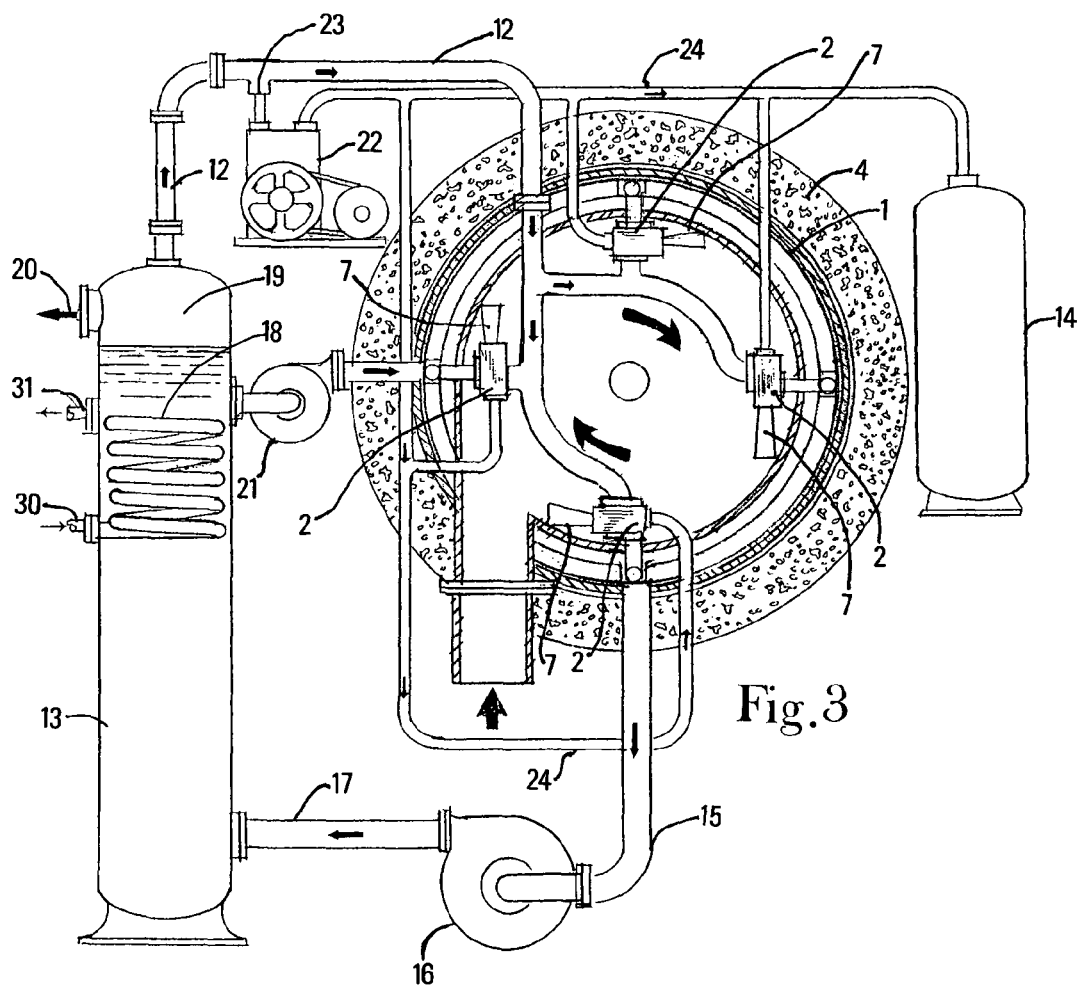
FIG. 3 Is a top view of the interior of the scrubber receiver and receiver manifolding shown principally in cross-section and is shown connected to water separator separation vessel 13 and recirculation chamber air storage vessel 14 that are positioned outside the ceramic stack structure.

FIG. 3 is a top view of the stack 4 and the interior mounted absorption equipment shown principally in cross-section sectioned through receiver 1 and showing the CO$_2$ separation vessel 13 and air storage vessel 14.

Carbonated water spray from nozzle 7 is collected at the bottom of receiver 1 and pumped from scrubber water line 15 by scrubber scavenger pump 16 and discharged into separator vessel 13 through line 17. The carbonated spray water from line 17 then flows upward in separator vessel 13 passing through steam heater coil 18 releasing the absorbed CO$_2$ into volume 19. Steam enters heater coil 18 at steam inlet 30 and exits the heater coil 18 at steam outlet 31. The released CO$_2$ passes from the separation vessel 13 volume 19 through disposal line 20 to the treatment facility for organic synthesis.

The decarbonated water above heater coil 18 is recirculated to ejectors 2 by recirculation pump 21 and repeats the scrubbing process.

Nearly 80% of the flue gas combustion air is nitrogen which mostly separates from the CO$_2$ of volume 19 and is taken into line 12. Air pump 22 also takes fluid from reflux line 12 at point 23 and pressurizes air storage vessel 14 for operation of ejectors 2. The remaining air from reflux manifold is then taken into the CO$_2$ reflux inlets 8 of ejectors 2. The discharged from air pump 22 is discharged into air line 24 for operation of ejectors 2. The scrubbed flue gas components that are not absorbed in the reflux operation are then released to stack 4 for atmospheric exhausting.

FIG. 4 is a top view of the receiver 1 with eccentrically mounted flue gas inlet 5. When FIG. 4 is sectioned at section line 25 the three assembled components of receiver 1 are shown in cross-section in FIG. 9. A top band, designated as compression band 27 is fixedly attached to the upper edge of receiver 1 in front of orifices 26. The purpose of the compression band 27 is to slightly raise and maintain the ejector 2 impact pressure at wedge point 29 on the inner surface of the receiver 1 for a sufficient period of time necessary to maintain retention of the absorbed CO$_2$ while it passes through orifices 26 into rotating table 28 of FIG. 1 of the original design and then into line 17. The compression band 27 promotes a wedge point 29 squeezing action against the side of receiver 1 retaining the impact pressure of the flue gas and water spray until it passes through holes 26 into rotating table 28.

FIGS. 6, 7 and 8 are the dissembled components of FIG. 9.

FIG. 9 is the assembled components of receiver 1 in which the compression band 27 and receiver 1 bottom closure 32 are assembled into the said receiver 1.

| Sequence Listing | |
|---|---|
| 1. | receiver |
| 2. | ejector |
| 3. | drum |
| 4. | stack |

| -continued | |
|---|---|
| Sequence Listing | |
| 5. | flue gas inlet |
| 6. | ejector body |
| 7. | nozzle |
| 8. | CO$_2$ reflux inlet |
| 9. | water spray |
| 10. | air inlet |
| 11. | ejector water inlet |
| 12. | reflux manifold |
| 13. | separation vessel |
| 14. | air storage vessel |
| 15. | scrubber line |
| 16. | scavenger pump |
| 17. | line |
| 18. | heater coil |
| 19. | volume |
| 20. | disposal line |
| 21. | pump |
| 22. | air pump |
| 23. | point |
| 24. | air line |
| 25. | section line |
| 26. | orifices |
| 27. | compression band |
| 28. | rotating table |
| 29. | wedge point |
| 30. | steam inlet |
| 31. | steam outlet |
| 32. | receiver bottom |

What is claimed is:

1. A coal flue gas scrubber for removing carbon dioxide from flue gases of coal fired furnaces, said scrubber comprising a cylindrical vessel hereinafter termed a scrubber barrel, said scrubber barrel positioned within a coal fired furnace smoke stack, said scrubber barrel having a small opening at the top for gaseous flow into said smoke stack, a bottom opening hereinafter called a drain passage for sorbent liquid to drain into a sludge basin, a facility exhaust fan forcing combustion flue gases into a connecting duct, said conducting duct holding electrically charged plates for placing a charge on said combustion flue gases, said connecting duct eccentrically attached to the side of a receiver, said receiver axially concentrically positioned within said scrubber barrel, said eccentric attachment of said conducting duct to said receiver causes the flow of said charged combustion flue gas to move tangentially in a horizontal spiraling upward flow into a misting zone of said scrubber barrel, said misting zone containing finely diffused sorbent spray discharged from a plurality of ejectors, said ejector finely diffused sorbent spray being horizontally directed in the opposite direction of said horizontal spiraling flow of said receiver, said combustion gases from said receiver and finely diffused sorbent spray, into a coalescing zone, a condenser in said coalescing zone, said condenser having a plurality of water cooled plates and ultrasonic transducers mounted on said scrubber barrel, said finely diffused sorbent spray being condensed on said water cooled plates, said finely diffused sorbent spray coalescing on said coolant plates and passing downward to channels at the bottom of said water cooled plates and directed to the sides of said scrubber barrel bottom opening, a rotating table below said bottom opening, a scraper blade removing precipitate material from said rotating table, said sorbent spray and said precipitate material falling through said bottom opening into a sludge basin, a submersible sludge pump pumping sorbent and sludge out of said sludge basin.

* * * * *